United States Patent
Negi et al.

[11] Patent Number: 6,113,190
[45] Date of Patent: Sep. 5, 2000

[54] SEAT RECLINING DEVICE

[75] Inventors: Yoshitaka Negi; Shinya Nakamura; Kiyotaka Okamoto, all of Kosai, Japan

[73] Assignee: Fujikiko Kabushiki Kaisha, Tokyo, Japan

[21] Appl. No.: 08/937,879

[22] Filed: Sep. 25, 1997

[30] Foreign Application Priority Data

Sep. 30, 1996 [JP] Japan .................................. 8-259007

[51] Int. Cl.⁷ ...................................................... B60N 2/48
[52] U.S. Cl. ................................ 297/378.1; 297/378.12; 297/367
[58] Field of Search .............................. 297/367, 378.12, 297/378.1

[56] References Cited

U.S. PATENT DOCUMENTS

| | | | |
|---|---|---|---|
| 3,788,698 | 1/1974 | Perkins . | |
| 3,897,608 | 8/1975 | Impicciche . | |
| 4,070,058 | 1/1978 | Muehling | 297/378.12 |
| 4,076,309 | 2/1978 | Chekirda et al. | 297/378.12 |
| 4,457,557 | 7/1984 | Une | 297/378.12 |
| 4,502,730 | 3/1985 | Kazaoka et al. | 297/378.12 |
| 4,660,886 | 4/1987 | Terada et al. | 297/378.12 |
| 5,547,254 | 8/1996 | Hoshihara | 297/367 |

FOREIGN PATENT DOCUMENTS

| | | |
|---|---|---|
| 2 119 940 | 4/1971 | Germany . |
| 28 29 701 | 7/1978 | Germany . |
| 2 076 047 | 5/1981 | United Kingdom . |

OTHER PUBLICATIONS

Patent Abstracts of Japan, vol. 013, No. 532, Publication No. 01218407, Publication Date Aug. 31, 1989, "Reclinging Device", 1 pg.
European Search Report EP 97 20 2974, 2 pp.

*Primary Examiner*—Anthony D. Barfield
*Attorney, Agent, or Firm*—Thomas, Kayden, Horstemeyer & Risley

[57] ABSTRACT

A back rest member pivotable frontwardly and rearwardly and lockable at a plurality of pivotal positions thereof is provided with a transmission route for transmitting an urging force to urge the back rest member frontwardly, and a break mechanism for breaking the transmission route when the back rest member is in front of a normal pivotal position thereof.

13 Claims, 9 Drawing Sheets

SEAT RECLINING DEVICE

BACKGROUND OF THE INVENTION

1. Field of the Invention

The present invention generally relates to a seat reclining device, and particularly, it relates to a seat reclining device applicable to a seat of an automobile.

2. Description of Relevant Art

FIG. 1 shows a left elevation of a conventional seat reclining device 1 for a seat back of an automobile.

The seat reclining device 1 includes a base plate 2 fixed to a seat cushion end (i.e. to some member fixed relative to a seat cushion) or a vehicle body end, and an arm 3 fixed to a back rest 9 of the seat and rotatably supported on or pivoted to (hereafter sometimes collectively "pivoted to") the base plate 2.

The arm 3 pivotable about a support shaft on the base plate 2 is adapted to be locked in and unlocked from (hereafter sometimes collectively "lockable at") a voluntary one of a plurality of pivotal positions by a locking mechanism 4.

The locking mechanism 4 comprises a lower part 5 of the arm 3 formed with teeth 5a and called "upper tooth member", a lower tooth member 6 pivoted to the base plate 2 and formed with teeth 6a engageable with the teeth 5a of upper tooth member 5, a lever 7 pivoted to the base plate 2 and normally biased or urged in an arrowed CCW (counter-clockwise) direction A by a tensioned spring 7a, and an operation rod 8 vertically operable for forcing the lever 7 to rotate.

When the operation rod 8 is pulled in an arrowed upward direction B, the lever 7 is forced to rotate in a CW (clockwise) direction, resisting a resilient force of the spring 7a, releasing the lower tooth member 6 from a locking engagement with the upper tooth member 5 to unlock the arm 3 so that the back rest 9 is voluntarily pivotable in a frontward direction (CCW in FIG. 1) and a rearward direction (CW in FIG. 1).

As the back rest 9 is in a standing position when the arm 3 is unlocked, the gravity will force the back rest 9 to rearwardly fall to an end, or alternatively an occupant or someone else has to hold and rotate the back rest 9 at a desirable pivotal position.

To this point, there has been observed a seat reclining device including a spirally wound spring for normally urging a back rest in a frontward direction.

In this seat reclining device, therefore, the back rest is automatically urged frontwardly, i.e. in an anti-reclining direction, when an associated arm is unlocked.

However, the back rest is normally frontwardly biassed and accelerated, and has an increasing tangential speed all the way of rotation from a reclining position where it is unlocked to a most frontwardly inclined position, where it may have an unfavorably increased speed.

As a countermeasure there has been interposed a damper between a base plate and an arm pivoted thereto, with an unfavorable increase in number of component parts and a dear cost.

One might have employed a spiral spring with a decreased urging force, resulting in an insufficient tendency for a back rest to restore a standing position.

SUMMARY OF THE INVENTION

The present invention has been achieved with such points in view.

It therefore is an object of the present invention to provide a seat reclining device in which a pivotable back rest is frontwardly biased with a favorable urging force, when operated at a reclining side of a normal standing position (i.e. an angular or pivotal position where it normally is locked), and is kept free from undue urging forces, when moving at an anti-reclining side of the standing position.

To achieve the object, a first aspect of the invention provides a seat reclining device comprising a back rest member (9, 20) pivotable frontwardly and rearwardly and lockable at a plurality of pivotal positions thereof, a transmission route (30, 32, 21, 20) for transmitting an urging force to urge the back rest member frontwardly, and a break mechanism (11; 111) for breaking the transmission route when the back rest member is in front of a normal pivotal position thereof.

According to the first aspect, a back rest member is lockable at a plurality of its pivotal positions, and when it is positioned in front of one of the pivotal positions that is a normally employable lock position, a break mechanism breaks or opens a transmission route that otherwise would transmit an urging force to urge the back rest member frontwardly.

As the transmission route is cut, neither the urging force nor its fraction is transmitted.

According to a second aspect of the invention depending from the first aspect, the transmission route includes a movable element (21) movable in unison with the back rest member, and a follower element (32) adaptable by an engaging contact thereof with the movable element to follow a movement of the movable element is a resiliently resisting manner, and the break mechanism has a restriction means (11; 111) for restricting a movement of the follower element to interrupt the engaging contact thereof with the movable element.

According to a third aspect of the invention depending from the second aspect, the back rest member is pivotable integrally with an arm member (20) pivoted to a base plate (10), the movable element comprises a projection (21) provided on the arm member, and the follower element comprises an end (32) of a spiral spring (30) secured at another end (31) thereof to the base plate.

According to a fourth aspect of the invention depending from the third aspect, the restriction means comprises a bent part (11) of the base plate engageable with the end of the spiral spring.

According to a fifth aspect of the invention depending from the third aspect, the seat reclining device further comprises a pivotal shaft (22) for pivoting the arm member on the base plate, and the another end (31) of the spiral spring is engaged with the pivotal shaft.

According to a sixth aspect of the invention depending from the fifth aspect, the restriction means comprises a plate member (111) fastened to the pivotal shaft.

According to a seventh aspect of the invention depending from the third aspect, the seat reclining device further comprises a pivotal shaft (22) for pivoting the arm member on the base plate, and a fixing shaft (23) provided on the base plate in position downwardly spaced from the pivotal shaft, and the another end (31) of the spiral spring is engaged with the fixing shaft.

According to an eighth aspect of the invention depending from the seventh aspect, the restriction means comprises a plate member (111) fastened to the fixing shaft.

According to a ninth aspect of the invention depending from the eighth aspect, the spiral spring is interposed between the plate member and the base plate.

According to a tenth aspect of the invention depending from the eighth aspect, the plate member is interposed between base plate and the spiral spring.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 6:
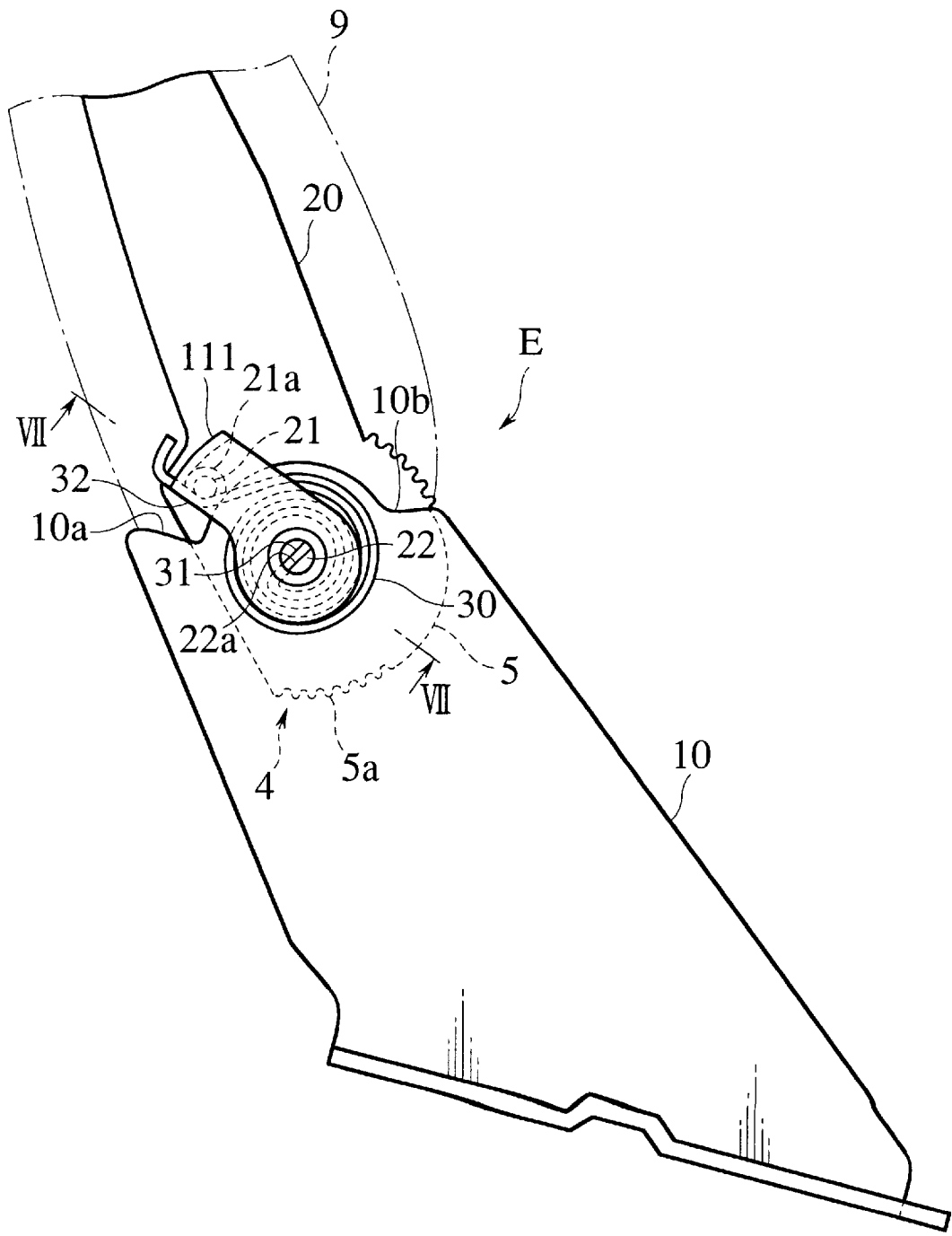
FIG. 6 is a right elevation of a seat reclining device according to a second embodiment of the invention.
Figure 7:
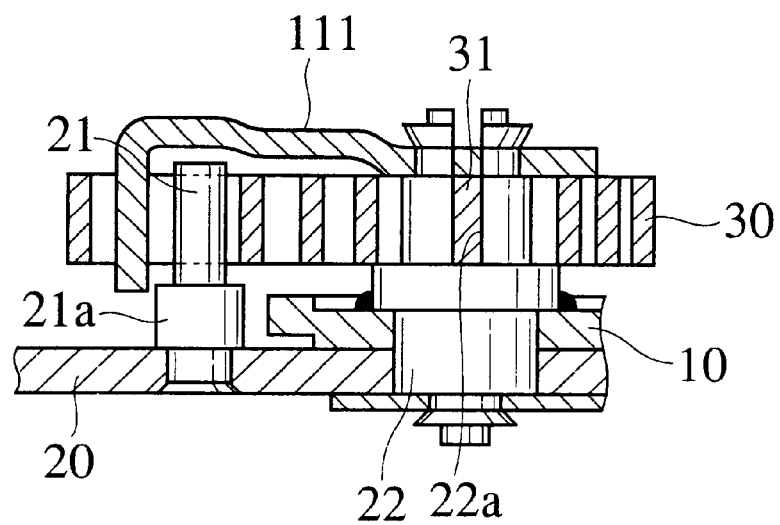
FIG. 7 is a section along line VII—VII of FIG. 6.
Figure 8:
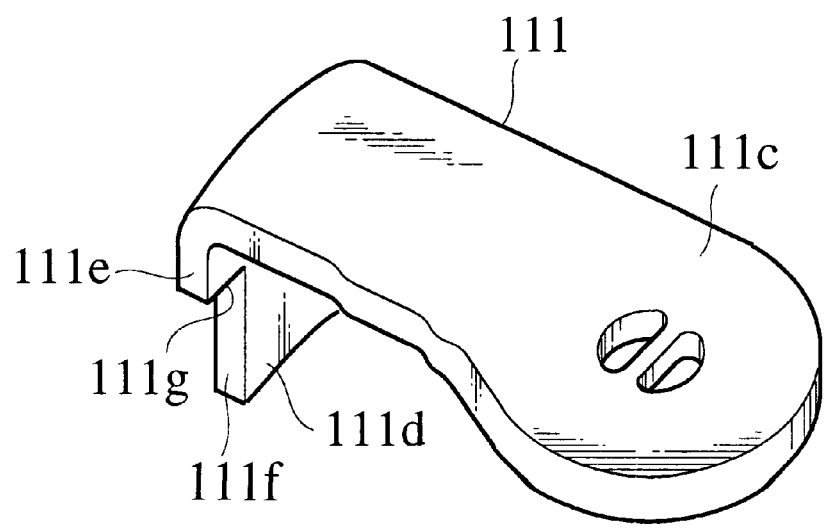
FIG. 8 is a perspective view of an essential member of the seat reclining device of FIG. 6.
Figure 9:
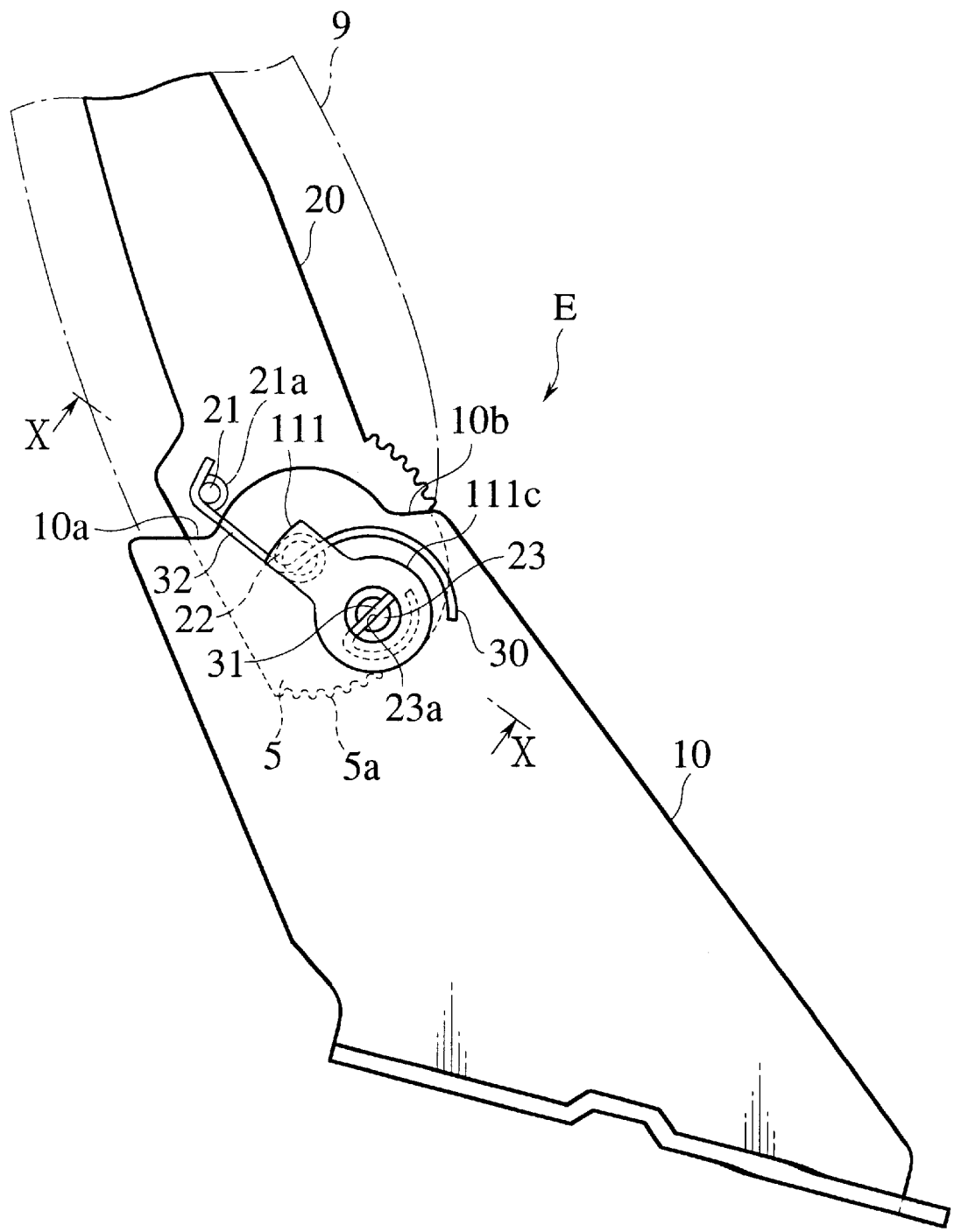
FIG. 9 is a right elevation of a seat reclining device according to a third embodiment of the invention.
Figure 10:
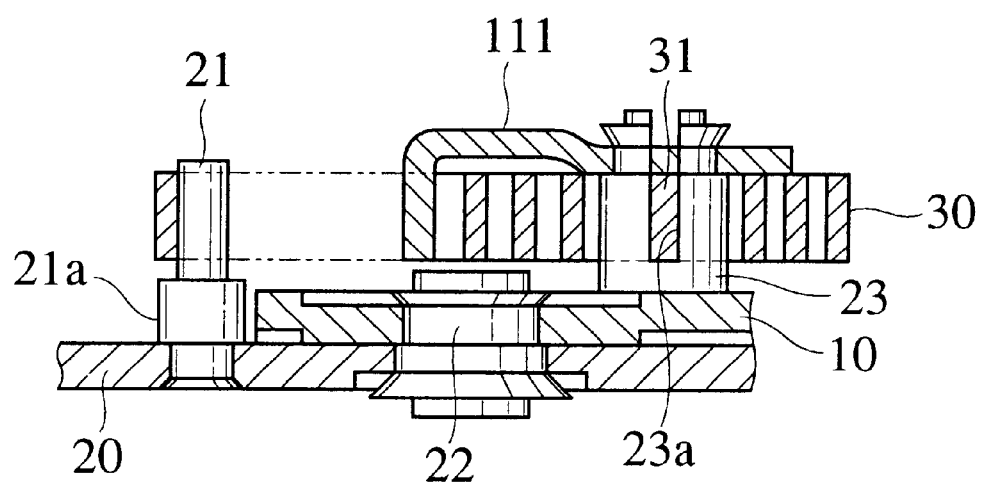
FIG. 10 is a section along line X—X of FIG. 9.

There will be detailed below the preferred embodiments of the present invention with reference to FIGS. 1 to 12, in which: FIGS. 2 to 5 show a first embodiment; FIGS. 6 to 8, a second embodiment; FIGS. 9 and 10, a third embodiment; and FIGS. 11 and 12, a fourth embodiment. Like members are designated by like reference characters. It is assumed that each embodiment has an unshown back rest pivot position adjusting mechanism analogous to that (4, 5, 5a, 6, 6a, 7, 7a, 8) of FIG. 1.

A seat reclining device according to the first embodiment will be described below with reference to FIGS. 2 to 5.

Figure 1:
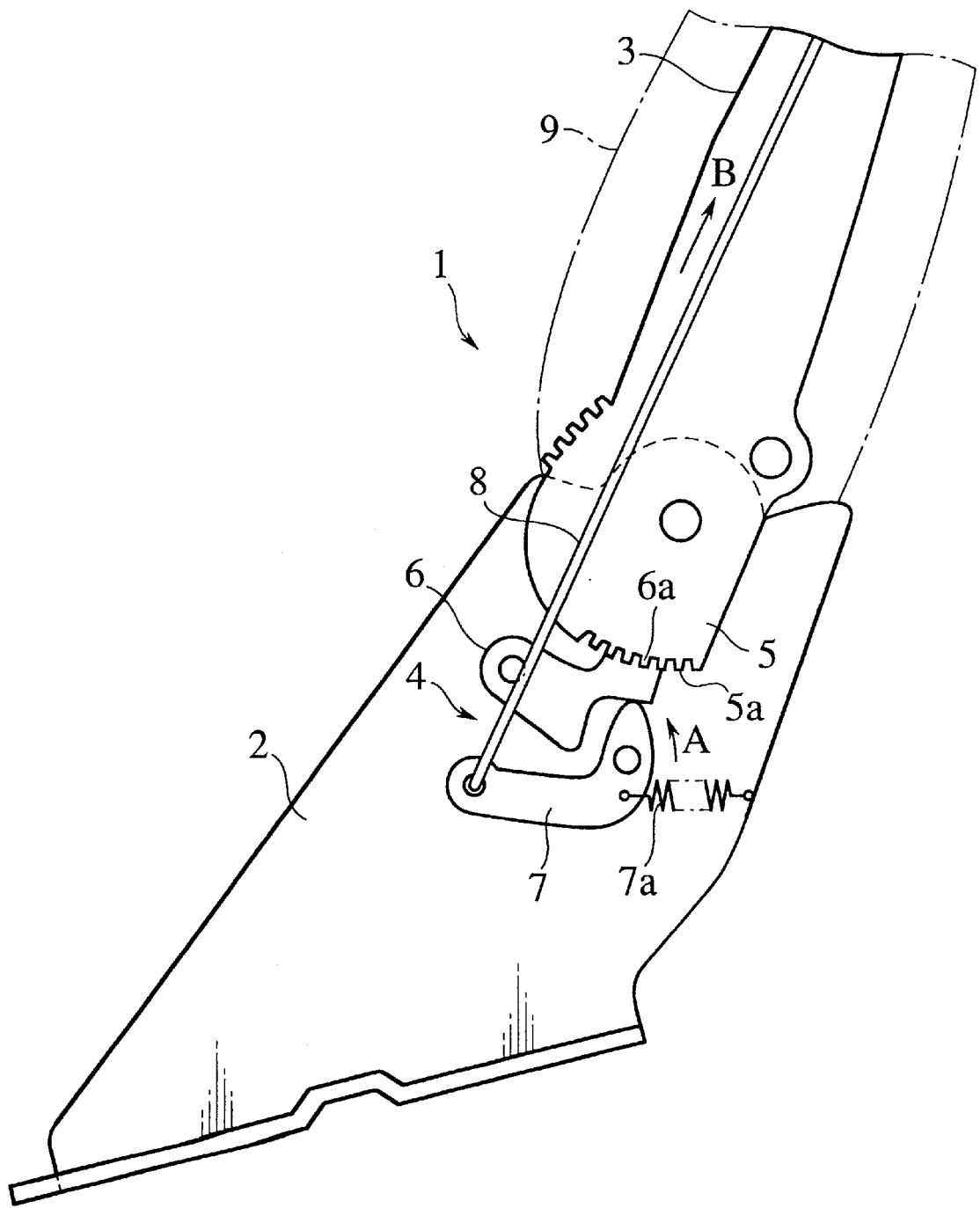
FIG. 1 is a left elevation of a conventional seat reclining device.
Figure 2:
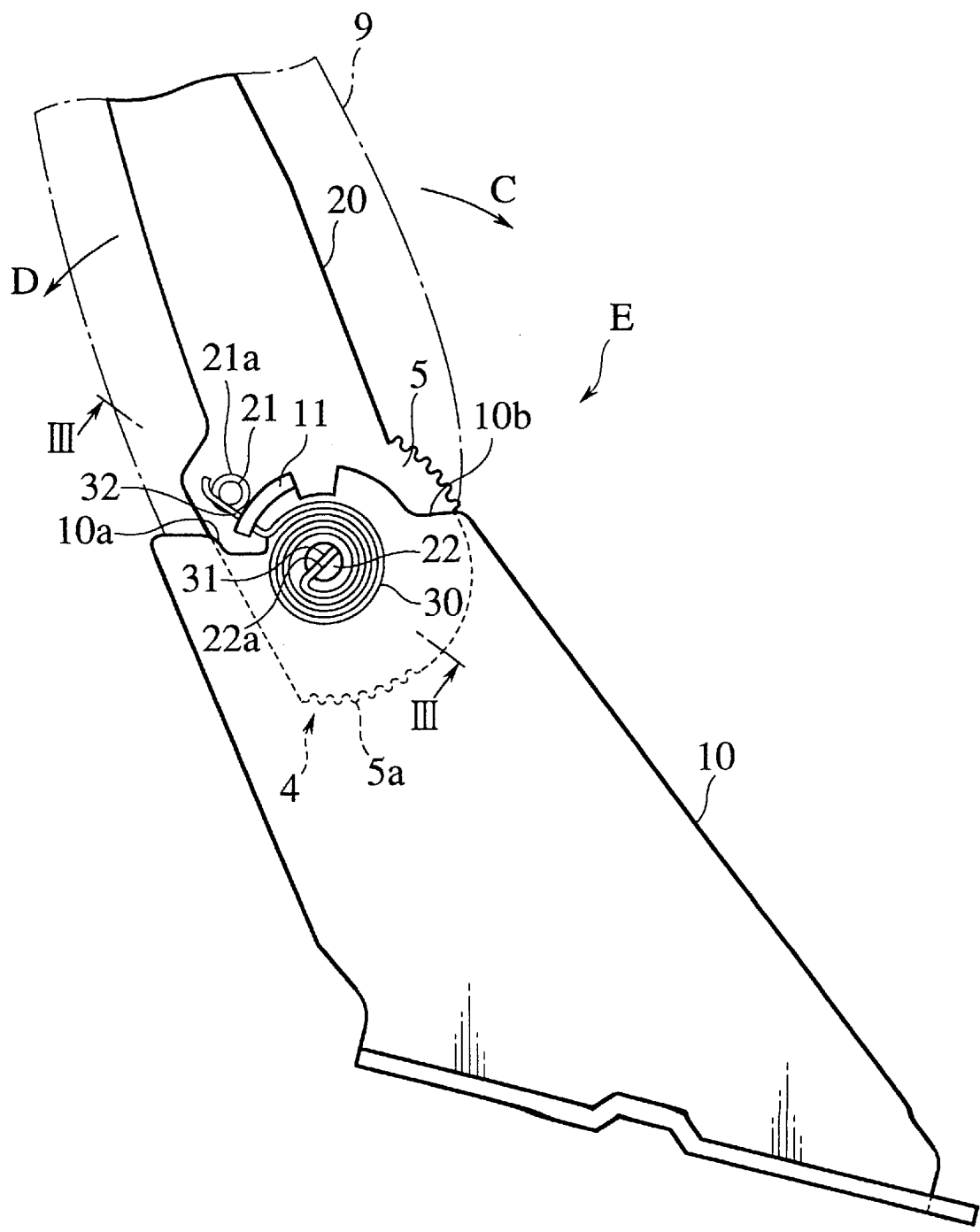
FIG. 2 is a right elevation of a seat reclining device according to a first embodiment of the invention.
Figure 3:
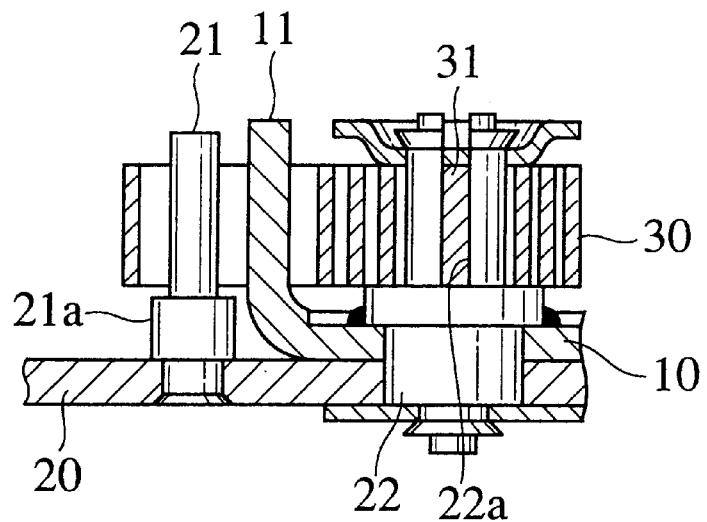
FIG. 3 is a section along line III—III of FIG. 2.

In FIG. 2, designated at reference character E is an entirety of the seat reclining device. The device E has a pair of left and right arms 20 for supporting a back rest 9. The arms 20 are each pivoted to a base plate 10 in a rotatable manner, and a locking mechanism 4 is provided for locking the arm at a voluntary position.

In this embodiment, a central end part 31 of a spiral spring 30 is secured to the base plate 10. The spring 30 is for urging the back rest 9 frontwardly or in an anti-reclining direction.

A hook part 32 as an outer peripheral end part of the spiral spring 30 is held to the base plate 10 end. The spring 30 is wound in advance for generating a sufficient resilient force.

The arm 20 has a projection 21 engageable with the hook part 32 of the spiral spring 30. During engagement, the projection 21 tightens the spring 30 in a winding direction, as the arm 20 rotates.

When the back rest 9 is operated from a normal lock position or standing position to a reclining direction, the tightening projection 21 engages with the spiral spring 30, applying a resilient force acting in the anti-reclining direction to the back rest 9.

Structure of the seat reclining device E will be described in detail.

The base plate 10 is fixed to a vehicle body end or to a seat cushion end (not shown). An engagingly locking part 11 as a holding measure for holding the hook part 32 of the spiral spring 30 is formed on an upper end part of the base plate 10.

Figure 4:
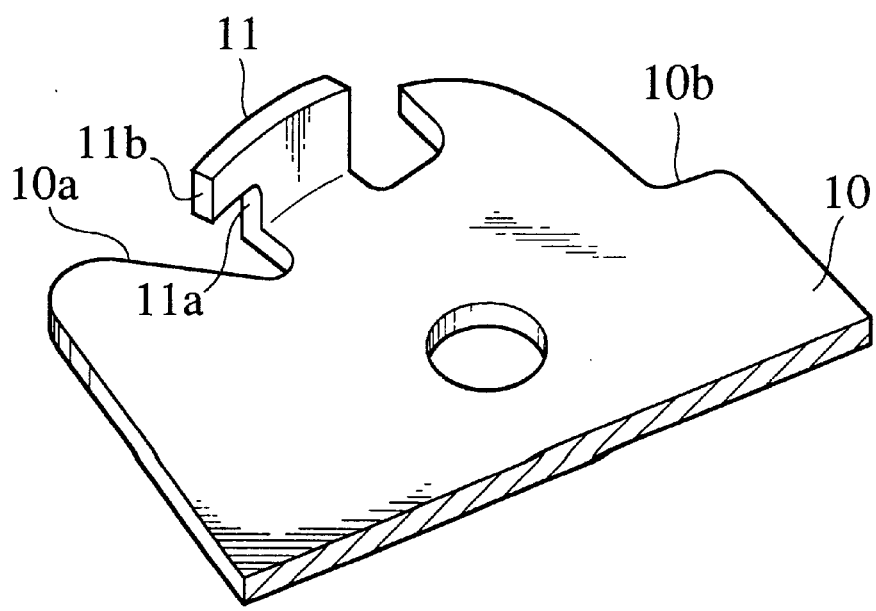
FIG. 4 is a perspective view of an essential part of a base plate in the seat reclining device of FIG. 2.
Figure 5:
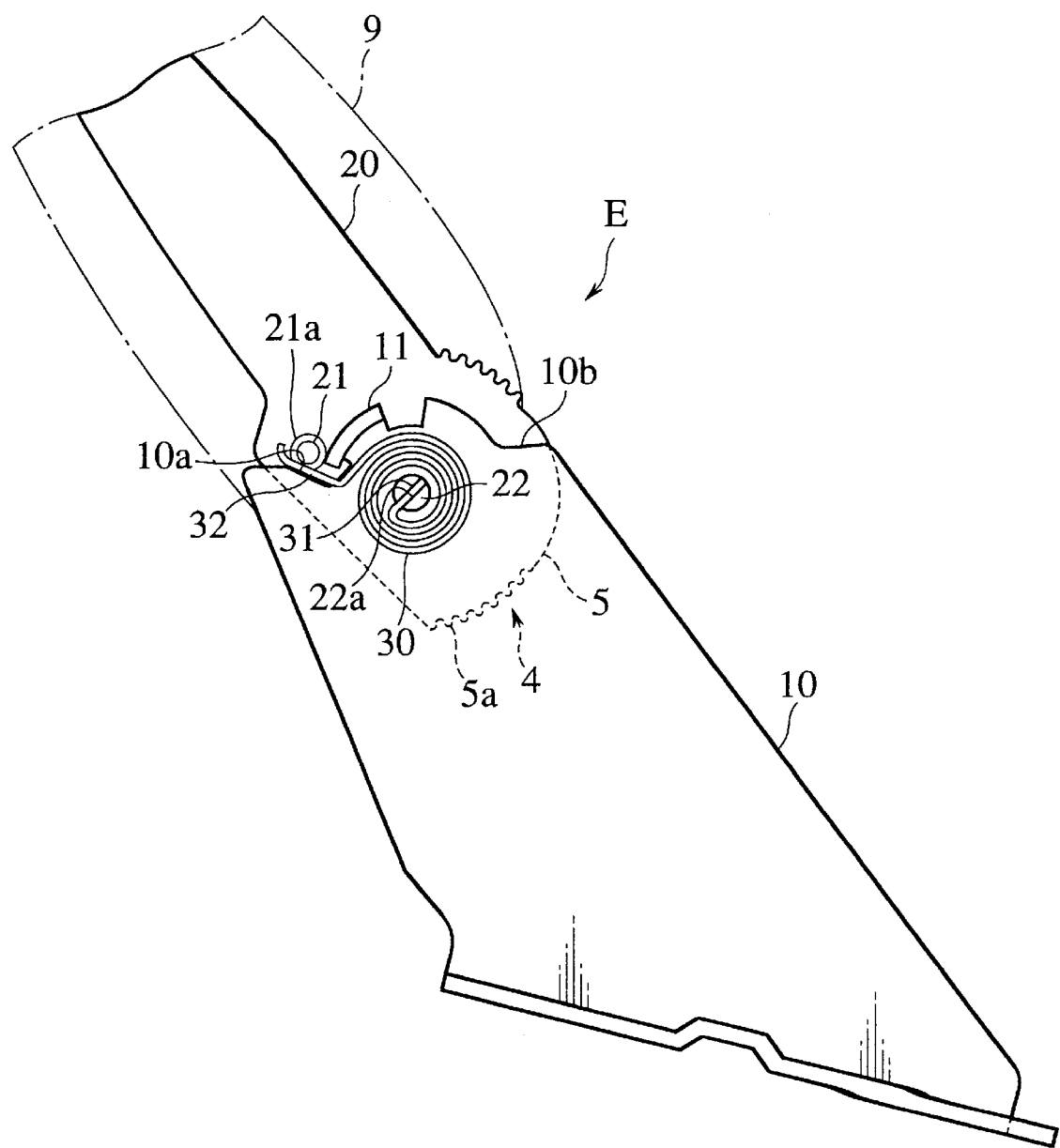
FIG. 5 is a right elevation of the seat reclining device of FIG. 2, with a back rest in a most rearwardly inclined position.

The locking part 11 is L-shaped in section as shown in FIG. 4 by bending the upper end part of the base plate 10. A part 11a bent at a right angle of the locking part 11 engages with the hook part 32 of the spiral spring 30 and has a projection 11b on an upper part thereof.

The arm 20 mounted on the back rest 9 is pivoted to be rotatable about a pivotal axis 22 provided on the base plate 10 in a projecting manner. Further, the arm 20 is integrally molded with an upper tooth member 5 constituting the locking mechanism 4.

The tightening projection 21, constituted with a pin member, is provided on the arm 20 and is disposed in an upper part close to the locking part 11 of the base plate 10. A base part 21a of the tightening projection 21 is contactable with stopper parts 10a and 10b formed on both right and left shoulder parts of the upper end part in the base plate 10, thereby setting a rotation limit in a rearward direction and a frontward direction of the arm 20. The tightening projection 21 is not limited to a pin, if it is integrally rotatable with the arm 20 and located in position engageable with hook part 32 and the stoppers 10a and 10b.

The spiral spring 30 is held by locking the central end part 31 with a locking groove 22a formed in a top surface of the pivotal axis 22 and engaging the hook part 32 with the bent part 11a of the locking part 11 of the base plate 10 in a preloaded manner. The hook part 32 of the spiral spring 30 is disposed vicinal to the lower surface of the projection 11b of the locking part 11 so that an escape of the spiral spring 30 to the lateral direction is restricted.

Functions of the first embodiment will be described below.

As shown in FIG. 2, when the back rest 9 is in a standing position, the tightening projection 21 of the arm 20 is in contact with the hook part 32 of the spiral spring 30 to which an urging force is applied.

In this standing position, when the arm 20 is unlocked and the back rest 9 is operated in the anti-reclining direction, i.e. frontwardly (along an arrow C), the tightening projection 21 of the arm 20 is disengaged off from the hook part 32 of the spiral spring 30. As the resilient force of the spiral spring 30 is not applied, the back rest 9 is moderately rotatable frontward from a standing position.

When the arm 20 is unlocked and the back rest 9 is rotated in a reclining direction from the standing position of FIG. 2, i.e. rearwardly (along an arrow D), the spiral tightening projection 21 of the arm 20 is engaged with the hook part 32 of the spiral spring 30 and tightens the spring in a winding direction, and the hook part 32 is apart from the locking part 11 of the base plate 10, applying a resilient force acting in the anti-reclining direction to the back rest 9. As the back rest 9 is urged or biased toward the standing position, the back rest 9 can be slowly rotated in the rearward direction so that a seated occupant can comfortably perform the reclining operation.

The second embodiment will be described below with reference to FIGS. 6 to 8. The second embodiment is different from first embodiment in that an engaging plate 111 is fixedly provided on the pivotal axis 22 which is axially attached to the base plate 10 and the arm 20 as a holding means for holding the hook part 32.

The plate 111 is L-shaped in section. It comprises a body part 111c and a bent part 111d bent at a right angle from a front end part of the body part 111c toward an inward direction (a downward direction in FIG. 8). The body part 111c is fixed to the side part of the spiral spring 30 by the pivotal axis 22.

A spring contact part 111f and a spring pressing part 111g are formed on a lower part of a part 111e bent at a right angle of the bent part 111d in a notching manner.

The hook part 32 of the spiral spring 30 is in contact with and held on the spring contact part 111f in a state preloaded for giving a sufficient urging force to the spiral spring 30. The spring pressing part 111g restricts an escape of the spiral spring 30 in the lateral direction.

The third embodiment will be described below with reference to FIGS. 9 and 10.

This embodiment is different from the second embodiment in that the central end part 31 of the spiral spring 30 is secured to a spring mounting axis 23 provided on the base plate 10, so that the central end part 31 is shifted from the pivotal axis 22 to the base part end of the base plate 10. The engaging plate 111 is mounted to the spring mounting axis 23.

The central end part 31 of the spiral spring 30 is locked with a locking groove 23a formed in a top surface of the spring mounting axis 23. The engaging plate 111 is fixed to the side part of the spiral spring 30 by the spring mounting axis 23.

Figure 11:
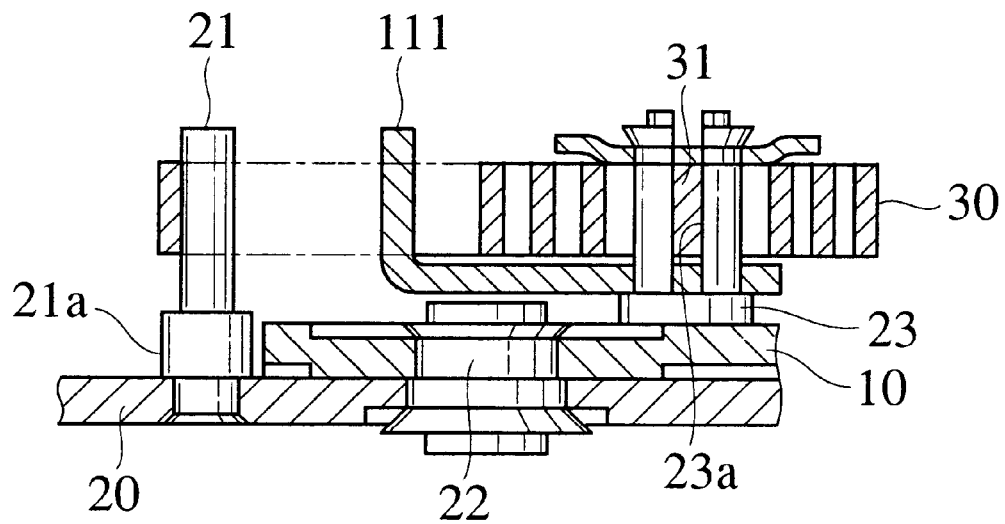
FIG. 11 is a sectional view of an essential portion of a seat reclining device according to a fourth embodiment of the invention.

The fourth embodiment will be described below with reference to FIGS. 11 and 12.

Figure 12:
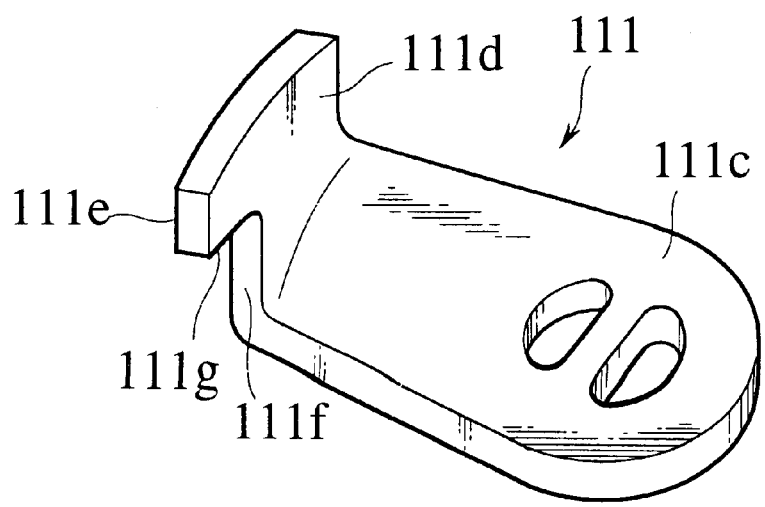
FIG. 12 is a perspective view of an essential member of the seat reclining device of FIG. 11.

In this embodiment, the bent part 111d of the engaging plate 111 is bent at a right angle from the front end part of the body part 111c toward an outer direction (an upper direction in FIG. 12). The plate 111 is held between the base plate 10 and the spiral spring 30, and is fixed to the spring mounting axis 23.

While preferred embodiments of the present invention have been described using specific terms, such description is for illustrative purposes, and it is to be understood that changes and variations may be made without departing from the spirit or scope of the following claims.

What is claimed is:

1. A seat reclining device comprising:
   a seat cushion with a base affixed thereto;
   a back rest member pivotable frontwardly and rearwardly within a predetermined angular range with respect to said base and lockable at a plurality of pivotal positions thereof;
   a sequence of mechanical elements interconnected to one another and movable in an arcuate path for transmitting torque from a source thereof to the back rest member to rotate the back rest member frontwardly when the back rest member is unlocked from said base; and
   a stationary break mechanism positioned in the path of said mechanical elements for interrupting linkage between said mechanical elements of the sequence of mechanical elements to break transmission of the torque applied to the back rest member when the back rest member is rotated frontwardly of a prescribed angle within the predetermined angular range.

2. A seat reclining device according to claim 1,
   wherein the sequence of mechanical elements includes:
   a movable element movable in unison with the back rest member; and
   a follower element adapted by an engaging contact thereof with the movable element to follow a movement of the movable element in a resiliently resisting manner, and
   wherein the break mechanism has restriction means for restricting a movement of the follower element to interrupt the engaging contact thereof with the movable element.

3. A seat reclining device according to claim 2,
   wherein the back rest member is pivotable integrally with an arm member pivoted to said base;
   wherein the source of the torque comprises a length of a spiral spring secured at one end thereof to the base,
   wherein the follower element comprises another end of the spiral spring, and
   wherein the movable element comprises a projection provided on the arm member.

4. A seat reclining device according to claim 3, wherein the restriction means comprises a bent part of the base plate engageable with said end of the spiral spring.

5. A seat reclining device according to claim 3, further comprising a pivotal shaft for pivoting the arm member of the base plate, wherein said another end of the spiral spring is engaged with the pivotal shaft.

6. A seat reclining device according to claim 5, wherein the restriction means comprises a plate member fastened to the pivotal shaft.

7. A seat reclining device according to claim 3, further comprising:
   a pivotal shaft for pivoting the arm member on the base plate; and
   a fixing shaft provided on the base plate in position downwardly spaced from the pivotal shaft, wherein
   said another end of the spiral spring is engaged with the fixing shaft.

8. A seat reclining device according to claim 7, wherein the restriction means comprises a plate member fastened to the fixing shaft.

9. A seat reclining device according to claim 8, wherein the spiral spring is interposed between the plate member and the base plate.

10. A seat reclining device according to claim 8, wherein the plate member is interposed between base plate and the spiral spring.

11. A seat reclining device (FIGS. 2–5) comprising:
    a seat cushion having a base fixed thereto;
    a back rest provided with an arm member which is pivotable frontwardly and rearwardly with respect to said base through an arcuate path within a predetermined angular range;

said arm member including means for locking said arm member at a plurality of pivotal positions thereof relative to said base;

a resilient member fixed to said base and configured for moving in a path and generating torque to frontwardly rotate said arm member together with said back rest with respect to said base when said arm member is unlocked from said base; and a stationary break mechanism positioned in the path of said resilient member for interrupting the movement of said resilient member and breaking the torque generated from said resilient member to said arm member, when said arm member is rotated frontwardly of a prescribed angle within said predetermined angular range.

12. The seat reclining device of claim 11, wherein said resilient member comprises a spiral spring fixed at an end thereof to said base; and wherein said arm member further includes a projection, and said resilient member engages with said projection.

13. A seat reclining device comprising:

a seat cushion having a base plate;

a back rest member frontwardly and rearwardly pivotable relative to the base plate within an angular range through a plurality of angular positions of said back rest member;

said back rest member having locking protrusions for locking said back rest member in the angular positions with respect to said base plate;

said back rest member including a spring-engaging projection extending therefrom;

a spiral spring having a first end fixed to said base plate and a second end extending free from said base plate and movable in an arcuate path and adapted to releasably engage said spring-engaging projection and bias said back rest member in a frontward direction;

said spring-engaging projection and said spring being adapted to rotate said back rest member frontwardly when said back rest member is unlocked and disposed rearward of a prescribed pivotal angle within said angular range; and a break mechanism for disengaging said second end of said spiral spring from said spring-engaging projection to relieve the bias of said spring against said spring engaging projection when said back rest member is rotated frontwardly beyond said prescribed pivotal angle.

* * * * *